United States Patent [19]

Cudnohufsky

[11] 4,395,841

[45] Aug. 2, 1983

[54] RELEASABLE MECHANISM FOR FISHING LINE

[76] Inventor: Sylvester R. Cudnohufsky, 5050 Ferry Rd., P.O. Box 582, East Jordan, Mich. 49727

[21] Appl. No.: 235,680

[22] Filed: Feb. 18, 1981

Related U.S. Application Data

[63] Continuation-in-part of Ser. No. 97,358, Nov. 26, 1979, abandoned.

[51] Int. Cl.³ .............................................. A01K 91/06
[52] U.S. Cl. .................................. 43/43.12; 43/44.95
[58] Field of Search ................ 43/27.4, 43.1, 43.12, 43/44.92, 44.95

[56] References Cited

U.S. PATENT DOCUMENTS

| | | | |
|---|---|---|---|
| 3,500,575 | 3/1970 | Klemkowski | 43/43.12 |
| 3,892,083 | 7/1975 | Peterson | 43/43.12 |
| 3,925,920 | 12/1975 | Walker | 43/43.12 |
| 4,069,611 | 1/1978 | Dusich | 43/43.12 |
| 4,221,068 | 9/1980 | Roemer | 43/43.12 |

*Primary Examiner*—Nicholas P. Godici
*Assistant Examiner*—Marc Hodak
*Attorney, Agent, or Firm*—Barnes, Kisselle, Raisch, Choate, Whittemore & Hulbert

[57] ABSTRACT

A device for releasably gripping a fishing line employed in conjunction with a downrigger device consists of a bracket attached to the downrigger device and having two line snubbing devices thereon. One of the line snubbing devices comprises a rearwardly extending stud means around which the line is wrapped and the other line snubbing device comprises a resilient means for releasably gripping the line.

37 Claims, 21 Drawing Figures

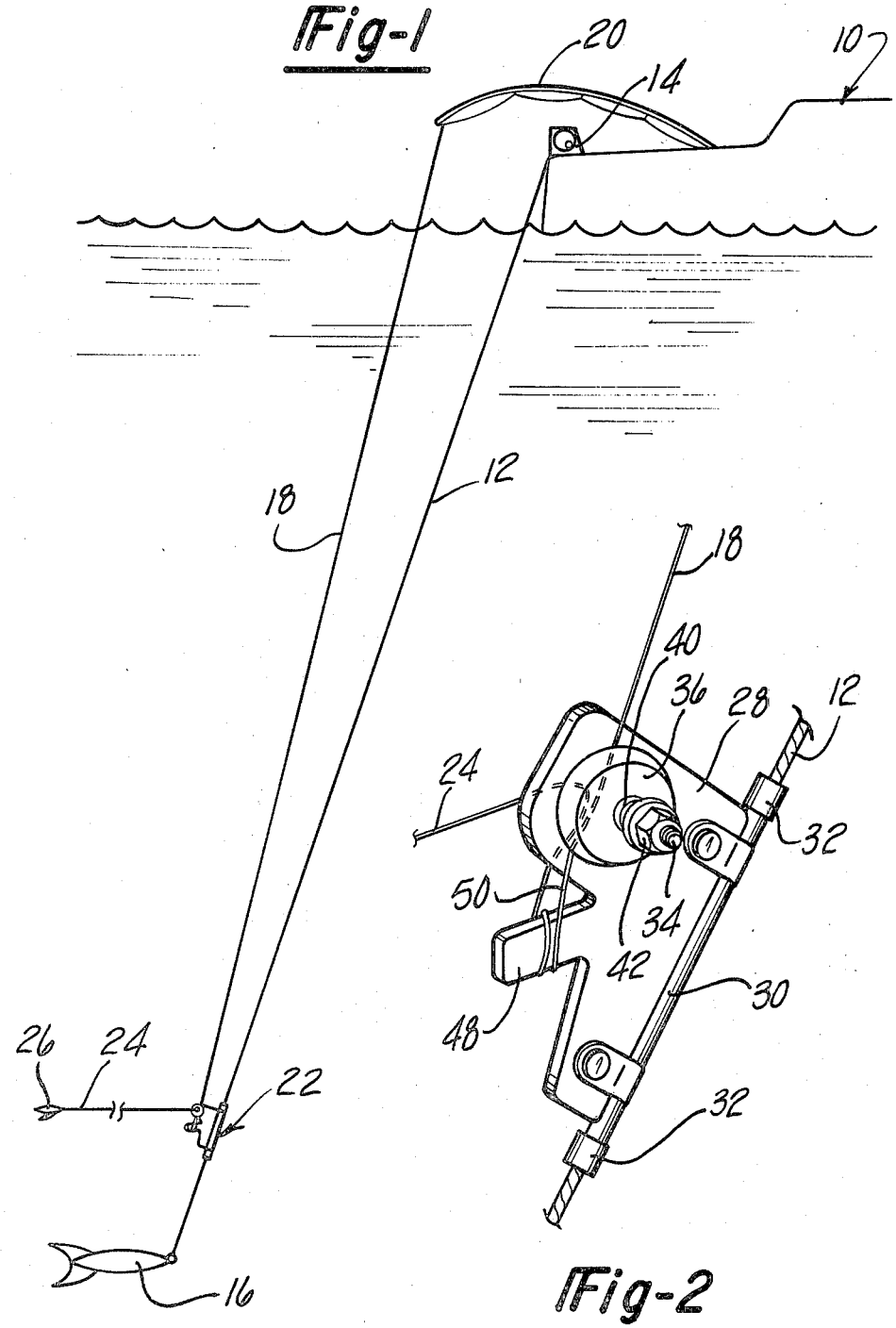

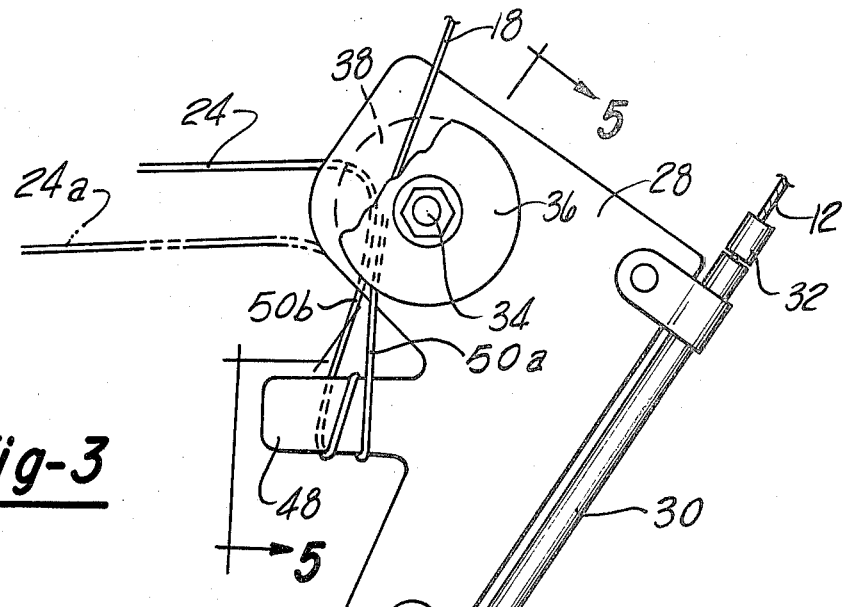
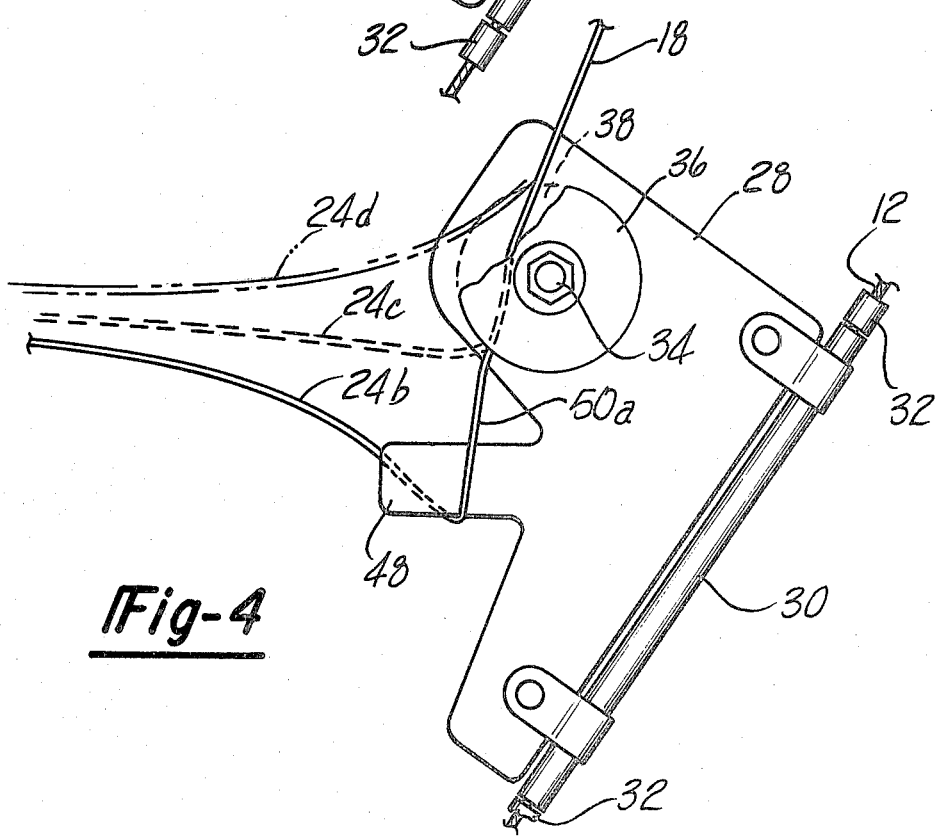

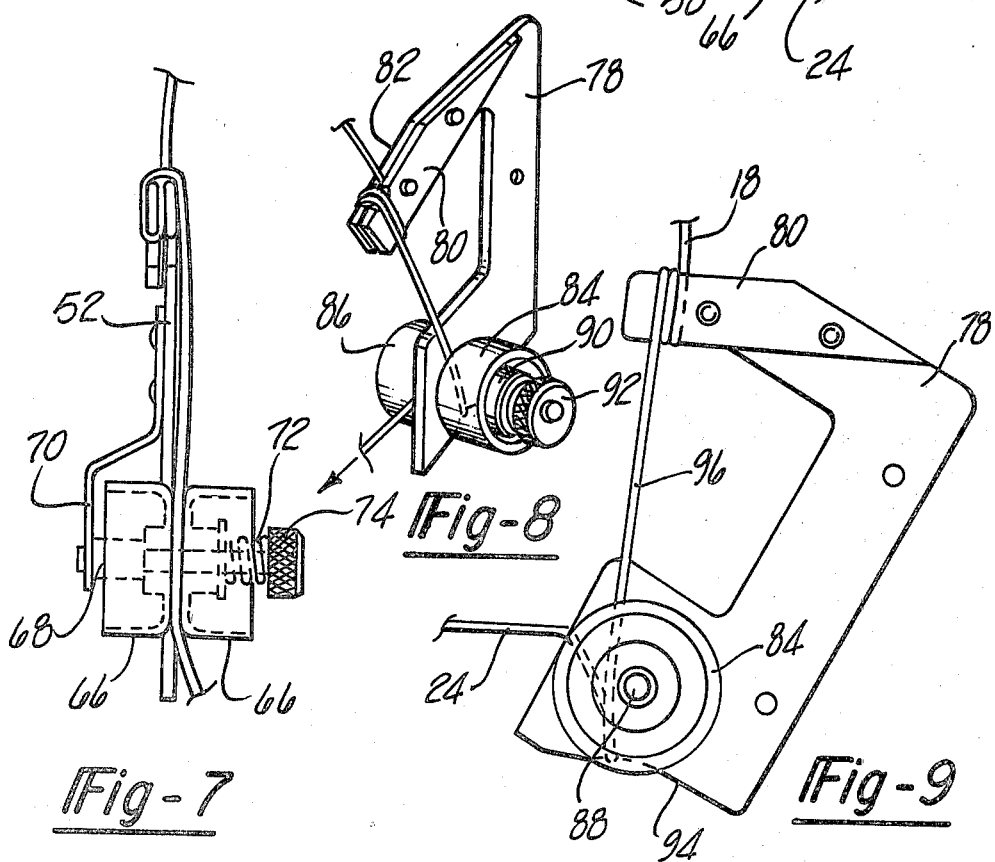

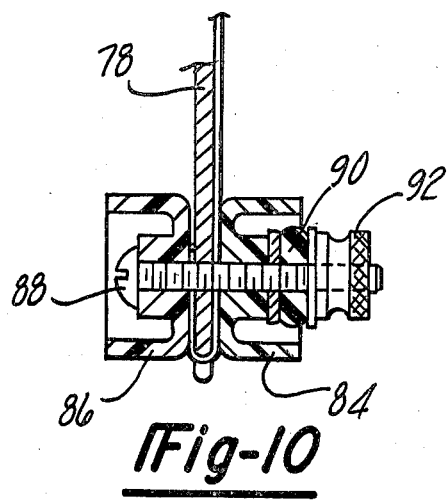
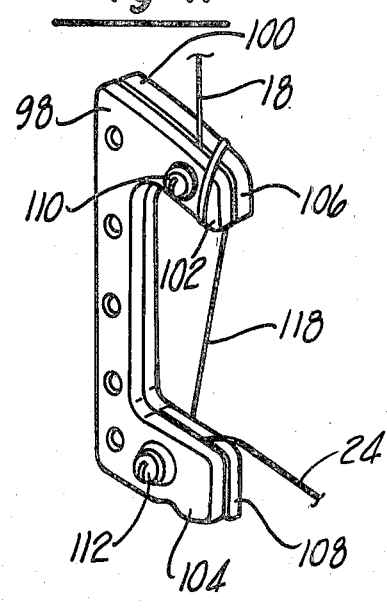
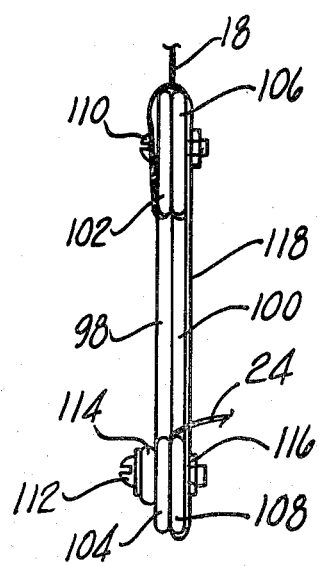
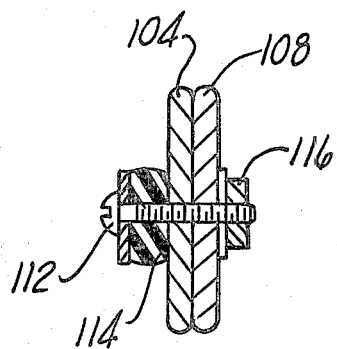

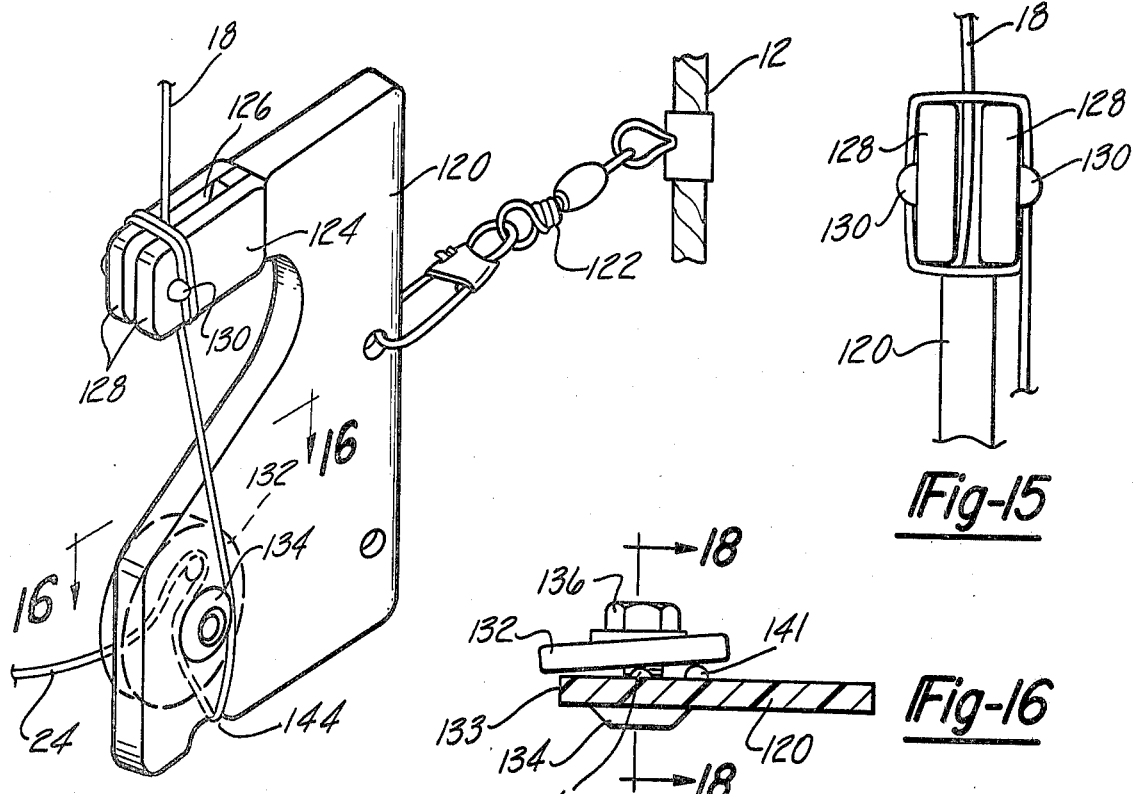
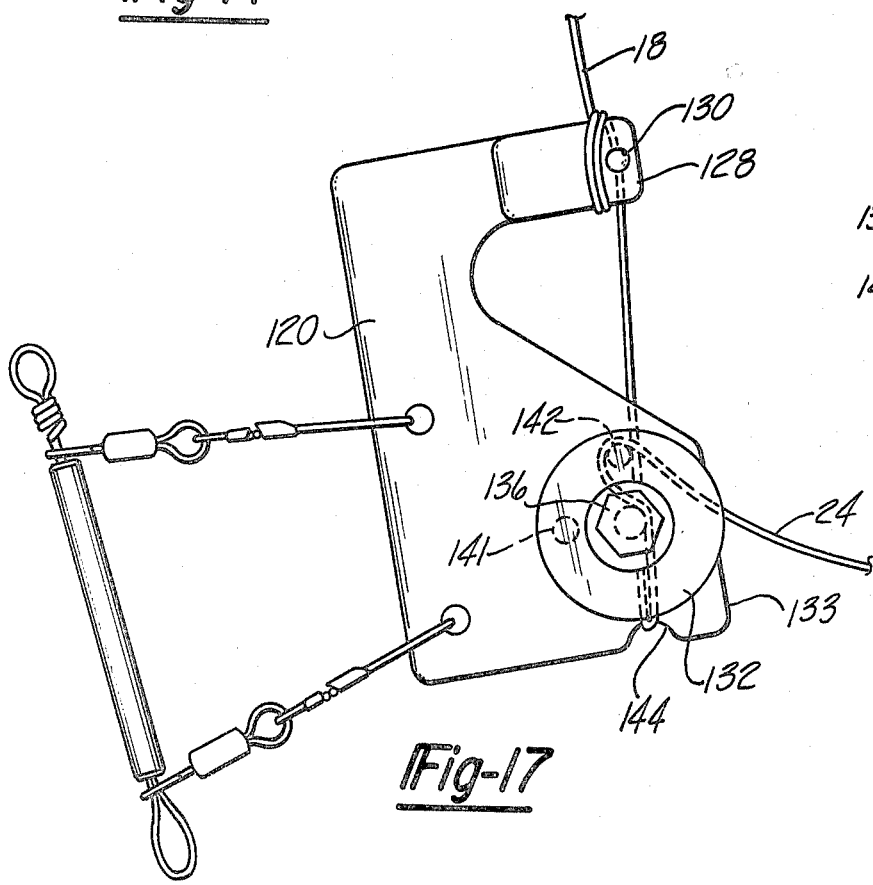

RELEASABLE MECHANISM FOR FISHING LINE

This application is a continuation-in-part of applicant's prior application Ser. No. 097,358, filed Nov. 26, 1979 and now abandoned.

This invention relates to a release mechanism for a fishing line used in conjunction with a downrigger device.

When trolling in relatively deep water a downrigger device is frequently employed to maintain the bait on the fishing line at a desired underwater depth. A downrigger device normally comprises a relatively heavy weight attached to the lower end of a winch-operated cable. The line from the fishing rod has a live or artificial bait on its end and is releasably connected to the downrigger weight or to the downrigger cable at a section thereof spaced some selected distance from the bait. When the fishing line is so arranged, the portion of the line extending between the downrigger device and the bait is pulled horizontally through the water at the desired depth. When trolling with a downrigger device in this manner it is essential that the fishing line be released from the downrigger device (the weight or downrigger cable) as soon as a fish strikes the bait. This enables the fish to be reeled in without reeling in the downrigger. The means usually employed for releasably attaching a fishing line to a downrigger device involves a spring biased line engaging mechanism which frictionally grips the line and releases it automatically when the tension on the fishing line exceeds a predetermined value determined by the setting of the spring bias on the line engaging device.

The portion of the fishing line extending between the rod and the downrigger device is inevitably subjected to a considerable amount of drag as it is pulled through the water. The amount of water drag on the portion of the line between the fishing rod and the releasable line engaging device depends upon the amount of line in the water and the extent to which this line bows or arches in a rearward direction between the rod and the release mechanism. With a conventional release mechanism the portion of the line between the rod and the release mechanism cannot be stretched tightly because the resulting tension would exceed the desired line releasing tension of the release mechanism. Therefore, unless the line release mechanism is designed to release the line independently of the force produced by the water drag or the tension on the line between the rod and the release mechanism, it follows that the line must be gripped by the release mechanism to a degree such that only a strike by a relatively large fish would release the line from the downrigger when trolling at normal trolling speed.

Although several devices have been proposed heretofore for attaching a fishing line to a downrigger in a manner such that a strike by even a small fish will release the line somewhat independently of the water drag on the line, such devices have not enjoyed commercial acceptance. For the most part the devices heretofore proposed are of complicated construction, unreliable in operation and costly to manufacture.

The present invention has for its primary object the provision of a release mechanism for a downrigger-attached fishing line which is adapted to release the line from the downrigger device in response to a rearward pull of a predetermined strength on the bait irrespective of the amount of water drag on the portion of the line extending down from the rod to the line release mechanism.

A further object of the invention is to provide a release mechanism of the type described which enables the line to be stretched relatively tight between the rod and the release mechanism so as to give an immediate visual indication when a fish strikes the bait.

Another object of this invention is to provide a release mechanism of the type described which enables the fisherman to release the line from the downrigger at will without reeling in the downrigger cable.

More specifically, the line release mechanism of the present invention is characterized by a bracket connected to the downrigger device and having two line snubbing devices thereon. One of the snubbing devices comprises a stud member which in the trolling position is generally horizontally disposed and extends in a rearward direction. The fishing line is adapted to be wound tightly around the free rear end portion of the stud. The other line snubbing device comprises a line gripping member that is resiliently biased to release the line when the trailing bait end portion of the line is subjected to a predetermined tension. The two snubbing devices are arranged on the bracket so that the line is released therefrom only in response to a predetermined tension on the bait trailing end portion of the line. The two snubbing devices are also arranged so that in the trolling position of the bracket the intermediate portion of the fishing line extending between and engaged by the two snubbing devices is generally in alignment with the portion of the fishing line extending downwardly from the fishing rod to the line release mechanism. Furthermore, the two line snubbing devices are preferably designed such that when the bracket on which they are mounted is displaced upwardly relatively rapidly, such as by quickly reeling in the downrigger, the fishing line is automatically released from the line release mechanism.

Other objects, features and advantages of the present invention will become apparent from the following description and accompanying drawings, in which:

FIG. 1 is a view generally illustrating the manner in which the line release mechanism of this invention may be employed in conjunction with a downrigger device;

FIG. 2 is a perspective view of one form of a releasing mechanism according to the present invention;

FIGS. 3 and 4 are side elevational views of the release mechanism shown in FIG. 2 and illustrating the manner in which a fishing line is released therefrom;

FIG. 5 is a sectional view taken along the line 5—5 in FIG. 3;

FIG. 6 is a perspective view of a second embodiment of a line releasing mechanism according to the present invention;

FIG. 7 is an end view of the release mechanism shown in FIG. 6;

FIG. 8 is a perspective view of a third embodiment of releasing mechanism according to the present invention;

FIG. 9 is a side elevational view of the release mechanisn shown in FIG. 8;

FIG. 10 is a sectional view through the line engaging spools of the embodiment shown in FIG. 9;

FIG. 11 is a perspective view of a fourth embodiment of a line releasing mechanism according to the present invention;

FIG. 12 is an end view of the device shown in FIG. 11;

FIG. 13 is a sectional view of the resilient line snubbing device on the embodiment shown in FIG. 11;

FIG. 14 is a perspective view of another embodiment of a line releasing mechanism according to the present invention;

FIG. 15 is a fragmentary rear end view of the device shown in FIG. 14;

FIG. 16 is a sectional view along the line 16—16 in FIG. 14 with the fishing line omitted;

FIG. 17 is a side elevational view of the device shown in FIG. 14;

FIG. 18 is a sectional view along the line 18—18 in FIG. 16; and

Figure 19:
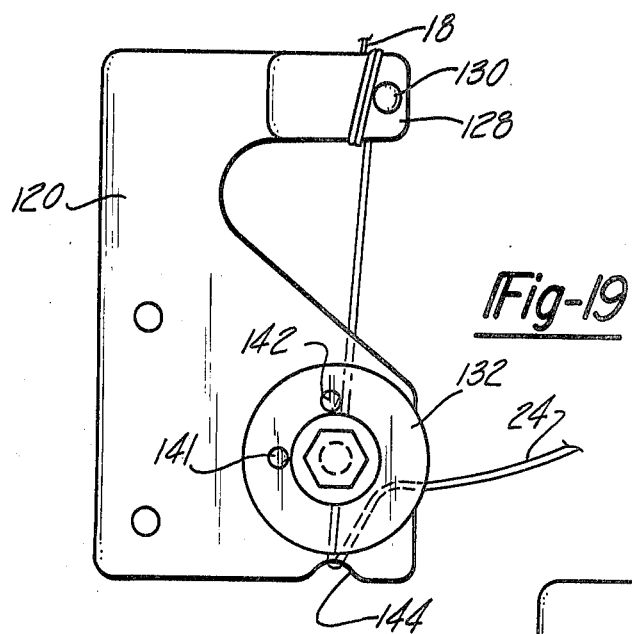
FIGS. 19, 20 and 21 show various modes of engaging the bait line with the device shown in FIG. 14.

Referring to FIG. 1, a conventional downrigger trolling arrangement is illustrated in connection with a boat 10. Downrigger cable 12 extends from a winch or reel 14 on the boat and has a downrigger weight 16 attached to its lower end. A typical downrigger weight 16 may weigh on the order of ten to twelve pounds. The fishing line 18 extends downwardly from a fishing rod 20 to a line release mechanism 22 to which it is attached and the trailing portion 24 of the line has a live or artificial bait 26 connected thereto. With the arrangement shown in FIG. 1 as the boat travels through the water at the desired trolling speed cable 12 and the portion 18 of the fishing line are inclined vertically to a degree depending upon the speed of the boat and the weight of the downrigger weight 16. The bait trailing portion 24 of the line extends generally horizontally rearwardly from the release mechanism 22.

The form of release mechanism shown in FIG. 2 comprises a bracket 28 attached to a cable 12 by means of a sleeve 30 which is retained at the desired depth on cable 12 by a pair of stops 32 releasably secured to the line. At the upper portion of bracket 28 there is mounted on a transversely extending screw 34 a pair of spools or discs 36,38. Spool 36 is biased against one face of bracket 28 by a spring 40, the tension of which is adjustable by a nut 42. The other spool or disc 38 is biased against the opposite face of bracket 28 by a similar spring 44 the tension of which is adjusted by a nut 46.

Below spools 36,38 a stud 48 projects rearwardly on bracket 28. The stud 48 is disposed on bracket 28 so that in the normal trolling position where cable 12 is inclined to the vertical stud 48 extends generally horizontally.

In using the release mechanism shown in FIGS. 2 through 5 the bracket 28 is first attached to cable 12 at the desired distance above weight 16. It will be appreciated, of course, that, if desired, bracket 28 can be designed so as to be attached directly to the weight. In any event, after the bracket is attached to the downrigger device, the fishing line 18 is engaged with the two snubbing devices 36,38;48 in the manner illustrated in FIG. 2. More specifically, the line 18 is drawn downwardly between spool 36 and the adjacent face of bracket 28, then wrapped once or twice tightly around stud 48 and finally drawn upwardly between spool 38 and the other face of bracket 28. The bait trailing portion 28 of the line extends outwardly from between spool 38 and bracket 28. The intermediate portion 50 of the line extending between these snubbing devices is relatively taut. After the line is attached to the bracket in this manner, both the cable 12 and the fishing line 18 are reeled out simultaneously until the weight 16 is at the desired depth. This operation may be performed while the boat is moving forwardly at the desired trolling speed. Thereafter the fishing line 18 is preferably reeled in so that the line 18 is taut and the fishing rod 20 is at least slightly arched. The line 18 can be tensioned to the desired degree by reason of the fact that the portion of the line extending from spool 36 down to stud 48, the portion designated 50a in FIGS. 3 and 4, is generally in alignment with the portion 18 of the fishing line. Therefore an upward pull on the portion 18 of the fishing line is transmitted substantially directly in a straight line to the stud 48 as an upward pull and there is no tendency for the tension on line 18 to pivot the bracket or release the line from either of the snubbing devices. Likewise, since the line 18 extends more or less straight down from the rod 20 to the spool 36 the water drag on the line is relatively slight and even light pressure of the spring 40 is more than sufficient to prevent the line from becoming disengaged from between spool 36 and bracket 28. If line 18 were not taut and bowed rearwardly substantially the water drag thereon would tend to release it from spool 36 much more readily.

The tension to which spring 44 is adjusted is such that when a fish of any appreciable size strikes the bait 26 the intermediate portion 50b of the line will be immediately pulled rearwardly out from between spool 38 and bracket 28. I have found that the trailing portion 24 of the line should release from spool 38 when the tension thereon is approximately equal to twice the tension thereon at the trolling speed. For example, if the trolling speed is about three miles per hour then the tension on spring 44 would be set so that the line will release when the trolling speed is at about six miles per hour.

Referring now specifically to FIG. 3 in the normal trolling position trailing portion 24 of the line normally assumes the position shown in solid lines. When a fish strikes the bait, the portion 24 of the line is pulled rearwardly, released from spool 38 and momentarily assumes the condition illustrated at 24a. Thereafter the continued rearward tension on the trailing portion of the line simply causes it to unwind from stud 48 as indicated at 24b. As soon as the line unwinds from stud 48 the line assumes the condition indicated at 24c where the tension is now effective to pull the line rearwardly from between spool 36 and bracket 28 as indicated at 24d. Thus the line is now completely released from the bracket and the rod 20 snaps back to a straight position. This gives an immediate visual indication to the fisherman that a fish has struck the bait. Since the line is completely free of the release mechanism the fish can be reeled directly up to the boat.

It will be noted that the intermediate portion 50b of the line extends upwardly from stud 48 between spool 38 and bracket 28 and then horizontally rearwardly. This particular configuration of the line in relation to the snubbing devices has a further advantage. If for some reason the fisherman desires to release the line from the line release mechanism he need only reel in cable 12 rapidly so that bracket 28 will be suddenly displaced upwardly. When this occurs the drag on the bait will cause the trailing portion 24 of the line to be inclined downwardly from spool 38 to the bait and the downward and rearward pull thus resulting will release the portion 24 of the line from spool 38 the line will then unwind from stud 48 and be released from spool 36 in the manner previously described.

The embodiment disclosed in FIGS. 6 and 7 differs from that in FIGS. 2 and 5 in several respects. Bracket 52 is secured to the cable line 12 in an entirely different manner. A bushing member 54 having enlargements at its upper and lower ends is slidably arranged on line 12. The enlargements are formed with grooves 56 adapted to be engaged by spring clips 58 extending through suitable vertically spaced openings on bracket 52. The bushing member 54 is designed to be retained on cable 12 at the desired depth by means of stops 60. Thus bracket 52 can be attached to or released from cable 12 by snapping clips 58 into and out of engagement with the grooves 56 on the bushing member.

Adjacent its upper end bracket 52 has a rearwardly extending stud or arm 62 and has somewhat loosely attached thereto a second stud or arm 64 which overlaps arm 62. Adjacent the lower end of bracket 52 there is mounted a pair of spools or discs 66. Spools 66 are journalled on a screw 68 which is fixedly mounted on an offset arm 70 securely fastened to bracket 52. The opposed inner faces of spools 66 are biased together in contacting relation by a spring 72 on screw 68 the tension of which is adapted to be adjusted by nut 74.

In using the device illustrated in FIGS. 6 and 7 the line 18 from the fishing pole is first drawn inwardly between the two arms 62, 64 and then wrapped preferably twice around the ends of the arms and extended downwardly between the two spools 66 in a relatively taut condition. In the trolling position of bracket 52 arms 62, 64 extend generally horizontally in a rearward direction and the spools 66 are located generally vertically below the end portions of arms 62, 64 so that the intermediate portion 76 of the line is generally aligned with the portion 18 extending downwardly from the fishing rod. The trailing portion 24 of the line extends horizontally rearwardly. With this arrangement when a fish strikes the line it is released from between spools 66 and then unwinds from arms 62, 64 so as to completely release the line from the bracket 52.

In the arrangement shown in FIG. 2 stud 48 is located below spools 36, 38 whereas in the arrangement shown in FIGS. 6 and 7 the arms 62, 64 around which the line is wrapped is located above the spools 66. In each case it is necessary to provide some means for preventing the line 18 from unwinding from the stud member in the event this portion of the line becomes slack. In the arrangement shown in FIGS. 2 through 5 spool 36 performs this function. However, in the arrangement shown in FIGS. 6 and 7 and in the other embodiments where the stud is located above the resilient line gripping members, the line 18 is prevented from unwinding from the stud when slack by forming the stud as a pair of arms between which the line is first engaged and then tightly wrapped around. By wrapping the line tightly around the ends of the arms after it is engaged therebetween and then drawing it down tightly into engagement with the lower resilient line gripping members, the line will not be accidently released from the arms when the portion extending down from the pole becomes slack. It will be appreciated that instead of loosely connecting arms 62, 64, one or both of these arms could be formed as a light leaf spring member to enable insertion of the line between the two arms and then winding the line thereon to prevent it from slipping or unwinding therefrom.

The arrangement shown in FIGS. 8 and 9 is somewhat similar to that illustrated in FIGS. 6 and 7. The bracket 78 has arms 80, 82 thereon which function as a stud in the same manner as arms 62, 64. At the lower portion of bracket 78 two spools 84, 86 are journalled on screw 88 on opposite sides of bracket 78. A compressible rubber bushing 90 is arranged between the hub of one of the spools and a nut 92 threaded on screw 88 to adjust the pressure with which both of spools 84, 86 bear against the opposite side walls of bracket 78. Screw 88 is mounted directly on bracket 78 vertically below the rear end portion of arms 80, 82 and spaced slightly above the lower edge 94 of the bracket.

In the arrangement shown in FIGS. 8, 9 and 10 the line 18 from the pole is engaged between and wrapped around the arms 80, 82 in the same manner as described with reference to the embodiment illustrated in FIGS. 6 and 7. The intermediate portion 96 of the line is pulled straight down between bracket 78 and one of the spools 84, 86, extended down around the lower edge 94 of the bracket and then drawn upwardly between bracket 78 and the other spool. This arrangement operates in the same manner as those previously described. The tension on the two spools resulting from the compression of the rubber bushing 90 is adjusted such that a rearward pull on the portion 24 of the line in response to a fish strike will be sufficient to release the line from one of two spools. After the line is released from one of the two spools the tension on the other spool is decreased since the bushing 90 expands slightly and the line is therefore readily released from the other spool. Thereafter the line freely unwinds and releases from the arms 80, 82. In the event that it is desired to release the line from bracket 78 it is merely necessary to jerk upwardly on the downrigger cable 12 or reel it in quickly so that the trailing portion 24 of the line is subjected to a downward pull which will immediately release the line from the two spools 84, 86 as previously described.

In the arrangement shown in FIGS. 11 through 13 the bracket which is adapted to be connected to the downrigger weight 16 or the downrigger cable 12 comprises two plates 98, 100. Plate 98 has rearwardly extending upper and lower arms 102, 104. Likewise, plate 100 has rearwardly extending upper and lower arms 106, 108. The two plates 98, 100 are somewhat loosely connected together by screws 110, 112. However, on the lower screw 112 there is arranged a rubber bushing 114 which is adapted to be compressed by a nut 116 to adjust the force with which the two lower arms 104, 108 are pressed against each other.

In using the device illustrated in FIGS. 11 through 13 the line 18 from the rod is extended down between the two arms 102, 106, wrapped two or more times around the outer end portions of these arms and extended downwardly in a taut condition around the lower edge of one of the lower arms 104, 108 and then drawn upwardly between the two lower arms so as to be frictionally gripped thereby by reason of the tension applied to the two lower arms by the compressed rubber bushing 114. As in the previous embodiments illustrated, the intermediate portion 118 of the line is retained in a taut condition by the resilient gripping action of the two lower arms 104, 108. When the fish strikes the bait the trailing portion 24 of the line is pulled rearwardly out of engagement between the two arms 104, 108 and then unwinds and releases from the upper arms 102, 106 in the same manner as previously described. Likewise, if it is desired to release the line from the device it is merely necessary to jerk upwardly on the downrigger cable so that the trailing portion 24 of the line is subjected to a downward pull which releases it from between arms 104, 106.

In the arrangement shown in FIGS. 14 through 21 the bracket 120 is designed to be molded from plastic and is adapted to be connected to the downrigger cable 12 by a single swivel and hook connector 122 (FIG. 14) or by a double hook connector (FIG. 17). The upper end of bracket 120 is formed with a horizontal stud portion 124 which is bifurcated as at 126 so as to present a pair of parallel, rearwardly projecting arms 128. The slot 126 has a width at least slightly greater than the diameter of the heaviest fishing line to be used with the device. A rounded protuberance 130 is molded on the outer side of each arm 128.

Directly below slot 126 there is journalled on bracket 120 a disc plate 132 which overlaps and extends rearwardly beyond the vertical rear edge 133 of bracket 120 (FIG. 17). As shown in FIG. 18, bracket 120 is formed with a boss 134 which is threaded to receive a headed screw 136 on which disc 132 is journalled. A compressible O-ring 138 is seated in a counterbore on disc 136 beneath the head of screw 136. Rubber O-ring 138 has a diameter greater than the depth of counterbore 140 so that it is compressed by the underside of the head of screw 136 when the screw is threaded into boss 134. The adjacent faces of disc 132 and bracket 120 are chamfered around the screw openings as at 139.

Bracket 120 is formed with two rounded protuberances 141,142 which underlie the disc 132 and project outwardly from the bracket a distance equal to at least the diameter of the heaviest fishing line to be used. Protuberance 141 is preferably located forwardly of and in generally horizontal alignment with screw 136. Protuberance 142 is preferably located approximately directly above screw 136 and projects outwardly from the face of the bracket a lesser distance than protuberance 141 (FIG. 16). Thus, when screw 136 is threaded into boss 134 and rubber O-ring 138 is thereby compressed, disc 132 assumes a position inclined relative to the plane of bracket 120 in both horizontal and vertical directions. The lower peripheral edge portion of disc 132 engages the adjacent face of bracket 120 while the upper peripheral edge portion is spaced away from the adjacent face of bracket 120 by the protuberance 142. The rear vertically central portion of the disc bears against the vertical edge 133 of bracket 120 and the diametrically opposite front portion of the disc is spaced from the adjacent face of the bracket by protuberance 141 (FIG. 16).

In using the device illustrated in FIGS. 14 through 21 the line 18 from the rod can be engaged with the device in different ways. For example, as shown in FIGS. 14, 17 and 18, the line 18 is extended down between the two arms 128 and then wrapped around the outer sides of the arms one or more times behind protuberance 130. The protuberances 130 prevent the line from inadvertently slipping off the end of stud 124. The line is then extended downwardly through slot 126, against the face of bracket 120 opposite disc 132 and then drawn upwardly around the recess or notch 144 in the lower edge of the bracket. Thereafter the line is drawn upwardly between the lower portion of disc 132 and behind screw 136. The bait portion of the line can then be deflected forwardly to engage it around the forward side of protuberance 142. It is then pulled rearwardly around protuberance 142 and downwardly to its normal bait trailing position so that the line is pinched between the disc and the vertical edge 133 of bracket 120. The line snubbing or pinching action between the disc and the edge 133 of the bracket not only maintains the portion of the line between arms 128 and recess 144 in a taut condition, but also prevents the bait trailing portion 24 of the line from becoming wrapped around the forward side of screw 136. The line is also prevented from becoming accidentally wrapped around screw 136 by the protuberance 141 spaced forwardly of the screw.

When the line is arranged in the manner shown in FIGS. 14 and 17 and a fish strikes the bait, the bait trailing portion of the line is pulled rearwardly and disengaged from between the disc and the edge 133 of the plate and from behind protuberance 142. This is permitted by reason of the fact that O-ring 138 is compressible and permits disc 132 to tilt slightly on the shank of screw 136 sufficiently to permit the line to pass between the inner face of the disc and the rounded end of protuberance 142. When the bait trailing portion of the line is released from protuberance 142 it readily slips out of pinched engagement between the disc 132 and the face of bracket 120 so that a continued pull on the line will readily unwind it from arms 128 and, thus, completely free the fishing line from bracket 120.

The line can be engaged with the device so that a rearward pull of lesser or greater force will release the line without loosening or tightening screw 136. For example, as shown in FIG. 19, if the line is extended around recess 144 and then pulled upwardly and rearwardly to merely pinch it between the disc and the rear edge 133 of bracket 120, a very slight rearward pull on the bait trailing portion of the line will release it.

Figure 20:
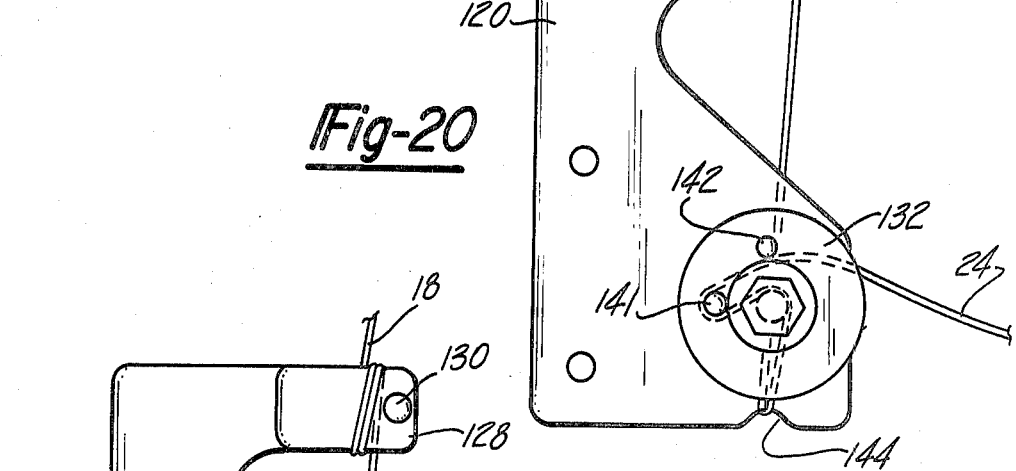
Figure 21:
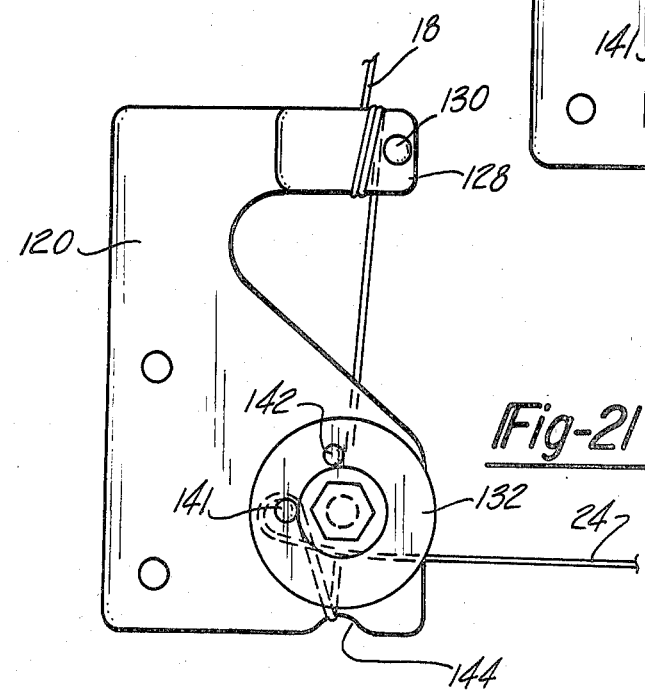

On the other hand, if a substantially heavier pull on the line is desired to release it, such as when a heavy fish lure is employed, then the line can be engaged with the device in the manner illustrated in FIGS. 20 or 21. In FIG. 20 the line is extended down from between arms 128, upwardly around recess 144 and then upwardly between bracket 120 and disc 136. The line is then extended forwardly and downwardly around both protuberances 141,142. It is then drawn upwardly around protuberance 141 and the rearwardly between screw 136 and protuberance 142 and pinched between the disc and the edge 133 of bracket 120. The rearward pull to disengage the line must then be of sufficient magnitude to snap the line over the larger protuberance 141. In FIG. 21 the line is engaged only around protuberance 141 and then extends rearwardly just below screw 136 rather than above it as in FIG. 20. It will be appreciated that, regardless of whether the line is arranged in the manner illustrated in FIGS. 17, 19, 20 or 21, the required rearward pull on the bait trailing portion of the line to release it can be increased or decreased by tightening or loosening screw 136.

The embodiment shown in FIGS. 14 through 21 has some distinct structural and functional advantages over the embodiments previously illustrated and described. In this particular embodiment it will be noted that disc 132 is spaced from bracket 120 by protuberances 141,142 and contacts the adjacent face of bracket 120 only at the lower peripheral edge portion of the disc and at the rear edge 133 of the bracket. Thus, the disc is inclined relative to the plane of bracket 120 in both horizontal and vertical directions. It follows that with this arrangement the line can be engaged between disc 132 and bracket 120 with relative ease. This is true for several reasons. The periphery of disc 132 is spaced from the adjacent face of bracket 120 around a greater portion of its entire periphery. The tapered clearance between the bracket and the disc enables the line to be readily engaged therebetween. In addition, it will be appreciated that, if desired, the force with which the disc engages the bracket can be substantially less than is the case with the previous embodiments because this force is localized at several discrete areas rather than being applied over the entire face of the disc. Thus, the line may be engaged behind the disc easily and is adapted to be released therefrom at an accurately predetermined tension. Furthermore, since the pressure required to retain the line is relatively light, there is little likelihood that the line will be damaged by the pinching force exerted thereon adjacent the lower and rear edge portions of the disc. As pointed out above the arrangement shown in FIGS. 14 through 21 permits a wide latitude in the selection of the tension required to release the line from the bracket and enables this adjustment to be made with a relatively high degree of accuracy without damaging the line while permitting easy engagement of the line with the disc. The chamfers 139 also prevent the line from being damaged or pinched by the threads of screw 136.

Although the device shown in FIGS. 14 through 21 can be used by simply engaging the line extending downwardly from stud 24 around protuberance 142, it is preferred to extend the line down and around notch 144 and then upwardly beneath the lower edge of the disc. With the preferred line arrangement there is little likelihood that the line will be accidentally released when the downrigger device is lowered rapidly to the desired depth in the water. At the same time, it will be appreciated that a direct rearward pull on the line is not necessary to release it from the bracket. The line will be readily released even though the fish that strikes the bait may dive up or down at a steep angle.

The primary function of protuberance 141 is to incline disc 132 so that it engages bracket 120 with line contact at edge 133. While it is preferred to employ both protuberances 141,142, either may be omitted but the efficacy of the device will be diminished.

The specific means by which each of the brackets described is attached to the downrigger device is not critical. The attachment should be such that the bracket is vertically fixed to the downrigger weight and remains in a generally vertical plane with the arms or stud around which the line is wrapped extending generally horizontally in a rearward direction.

I claim:

1. A device for releasably connecting a fish trolling line to an underwater downrigger device comprising a bracket, means for attaching the bracket to the downrigger device under water so that the bracket remains in a relatively vertically fixed and vertically oriented underwater position with respect to the downrigger device while trolling, a pair of line snubbing devices on said bracket with which a portion of the fishing line is adapted to be connected, one of said line snubbing devices comprising a pair of laterally disposed, closely spaced stud means located on the upper portion of the bracket between which a portion of the line extending downwardly from a fishing rod is adapted to be extended, then wrapped tightly around both stud means and then extended tautly to the hereinafter mentioned resilient gripping means, whereby the rearward water drag on the portion of the line extending downwardly from the fishing rod to the bracket is ineffective to release the line from said stud means, said stud means being located on the bracket so that in the trolling position of the bracket the laterally spaced stud means extend generally horizontally rearwardly relative to the trolling direction so that an axial rearward pull on the trailing end of the line is effective to freely unwind and thereby release the line from engagement with the stud means, the other of said line snubbing devices being located on the lower portion of said bracket and comprising a means for resiliently gripping an intermediate portion of the line and adapted to release the line engaged therewith when the portion of the line trailing the bracket in the water is subjected to a pull in a rearward direction of at least predetermined strength, said gripping means also being adapted to retain said intermediate portion of the line extending between and engaged by said stud and gripping means in a taut condition, whereby a fishing line from a rod is adapted to be extended down to said bracket in a relatively taut condition and an intermediate portion of the line wrapped around said stud means and then engaged with said resilient line gripping means so that, when the rearward trailing bait end of the line is subjected to a rearward pull of predetermined strength by a fish striking the biat, the trailing end of the line is first released from the resilient gripping means and a continued rearward pull on the trailing end portion of the line then unwinds the line from the stud means to release the line from the bracket.

2. A device as called for in claim 1 wherein said stud means and resilient line gripping means are located on the bracket so that the intermediate portion of the line extending therebetween is generally aligned with the portion of the line extending downwardly from the fishing rod to the bracket when the bracket is in the trolling position.

3. A device as called for in claim 1 wherein said snubbing devices are spaced vertically apart on the bracket when the bracket is in trolling position.

4. A device as called for in claim 1 wherein the snubbing devices are spaced vertically apart on said bracket such that the intermediate portion of the line engaged thereby and extending therebetween is generally aligned with the portion of the line extending downwardly from the fishing rod to said stud means.

5. A device as called for in claim 1 wherein said stud means are spaced above said gripping means on the bracket.

6. A device as called for in claim 5 wherein said bracket has a generally horizontally extending free edge below said gripping means whereby the intermediate portion of the line extending downwardly from said stud means can be extended around said free edge and then upwardly into engagement with the gripping means, said gripping means being adapted to release the portion of the line extending from said free edge when the bracket is subjected to a sudden upward displacement as a result of the downward pull on the trailing bait end portion of the line.

7. A device as called for in claim 6 wherein said gripping means comprises a pair of laterally separable members resiliently biased toward each other to enable the line to be extended generally vertically therebetween and thereby frictionally gripped by said separable members.

8. A device as called for in claim 6 wherein said gripping means comprises a pair of rearwardly extending arms laterally separable to enable the line to be extended generally vertically therebetween, said arms being resiliently biased laterally toward one another to grip the line therebetween, said free edge being defined by the lower edge of one of said arms.

9. A device as called for in claim 1 wherein said resilient gripping means comprises a pair of discs which are laterally separable so that a line can be extended vertically therebetween and means biasing the discs toward each other.

10. A device as called for in claim 9 wherein said bracket comprises a plate member, said discs being located one on each of the opposite sides of the plate.

11. A device as called for in claim 10 wherein each disc has independent biasing means acting thereon.

12. A device as called for in claim 1 wherein said resilient gripping means comprises a pair of laterally separable members resiliently biased toward each other to enable the line to be extended generally vertically therebetween.

13. A device as called for in claim 1 wherein said stud means comprises a pair of rearwardly projecting, generally horizontally disposed arms which are loosely connected at their forward ends so as to be at least slightly laterally separable to permit the line to be inserted vertically therebetween from the rear ends thereof and then tightly wound around both fingers and then extended in a generally taut condition into engagement with the resilient gripping means.

14. A device as called for in claim 1 wherein the gripping means comprises a pair of laterally separable members which when separated enable the line to be inserted therebetween in a forward direction while the line is extending generally vertically and means biasing said members laterally toward each other.

15. A device as called for in claim 1 wherein said stud means comprises a pair of generally horizontal, rearwardly projecting, laterally separable members which when separated are adapted to have a vertically extending portion of the line inserted therebetween in a forwardly direction from the rear ends thereof, said members being adapted to be drawn toward each other to tightly frictionally grip the line extending vertically therebetween when the line is tightly wrapped therearound.

16. A device as called for in claim 15 wherein said stud means are located vertically above said resilient line gripping means and extend rearwardly in generally the same vertical plane as the line gripping means.

17. A device as called for in claim 16 wherein the line gripping means also comprise a pair of rearwardly projecting, laterally separable members and including means biasing said members laterally toward each other for frictionally gripping the line therebetween.

18. A device as called for in claim 1 wherein said resilient gripping means comprises a plate resiliently biased against a vertical face portion of the bracket and a tapered protuberance means extending transversely between a localized portion of said plate and said face portion and retaining said localized portion of the plate spaced from said face portion of the bracket, said intermediate portion of said line, after being wound around said stud means, being adapted to be extended through the space between said plate and face portion and around said protuberance means and then rearwardly to the trailing bait so that, when said trailing bait portion of the line is subjected to a rearward pull of predetermined strength by a fish striking the bait, the line is first pulled rearwardly and released from engagement from around said protuberance means and then unwinds from said stud means to release the line from the bracket.

19. A device as called for in claim 18 wherein said protuberance means is spaced vertically below the portion of the stud means on which the line is adapted to be wound.

20. A device as called for in claim 19 wherein said resilient gripping means also includes a line pinching member on said bracket spaced below and aligned generally vertically with the portion of said stud means around which the line is adapted to be wound, said line pinching member being biased against a portion of the bracket so that said intermediate portion of the line, after being wound around said stud means, is adapted to be extended downwardly to and frictionally engaged by said line pinching means before being engaged around said protuberance means.

21. A device as called for in claim 20 wherein said protuberance means comprises a protuberance disposed between said face portion of said bracket and one end portion of said plate, the other end portion of said plate comprising said line pinching member, said biasing means retaining the plate in a position inclined vertically to the plane of said face portion so that said one end portion of the plate is spaced from said face portion of the bracket by said protuberance and the other end portion of the plate is biased into contacting relation with said face portion of the bracket.

22. A device as called for in claim 21 wherein said plate comprises a circular disc journalled on said bracket.

23. A device as called for in claim 22 wherein said protuberance is mounted on said face portion of said bracket.

24. A device as called for in claim 23 including a pin journalling said disc on said bracket.

25. A device as called for in claim 24 wherein said pin comprises a screw to permit varying the force of said biasing means.

26. A device as called for in claim 24 wherein said protuberance is aligned generally vertically with said pin.

27. A device as called for in claim 26 wherein said stud means are located adjacent the upper end of the bracket and said bracket includes a lower edge portion around which the portion of the line extending downwardly from the stud means is adapted to be engaged before being directed into engagement with the line pinching means.

28. A device as called for in claim 27 wherein the portion of the stud means around which the line is adapted to be engaged, the protuberance and the pin on which the disc is journalled are generally vertically aligned, said protuberance being disposed vertically between said stud means and said pin.

29. A device as called for in claim 1 wherein said resilient line gripping means comprises a plate resiliently biased against a vertical face portion of said bracket and a pair of laterally tapered protuberances extending between laterally spaced localized portions of said plate and said face portion of the bracket, said intermediate portion of said line after being wound around said stud means being adapted to be extended between the space between said plate and said face portion and around one or both of said protuberances and then rearwardly to the trailing bait so that, when the bait trailing portion of the line is subjected to a rearward pull of predetermined strength by a fish striking the bait, the line is first released from around the protuberances and then unwound from said stud means to release the line from the bracket.

30. A device as called for in claim 29 wherein said stud means are located adjacent the upper end of said bracket and said plate and protuberances are located on said bracket below said stud means.

31. A device as called for in claim 30 wherein the two protuberances are spaced from each other both vertically and horizontally on said face portion of said bracket.

32. A device as called for in claim 30 wherein one of said protuberances is disposed above and rearwardly of the other protuberance.

33. A device as called for in claim 32 wherein said plate is connected to said bracket at generally the central portion thereof, one of said protuberances being disposed forwardly of the connection between the plate and the bracket such as to cause the rear portion of the plate to bear against the face portion of the bracket.

34. A device as called for in claim 33 wherein the bracket has a generally vertically extending rear edge, the rear edge portion of the plate extending rearwardly beyond said rear edge of the bracket so that it is in substantial line contact with said face portion of the bracket at the rear edge thereof.

35. A device as called for in claim 33 wherein said plate comprises a circular disc connected with the bracket by a threaded member, the threaded member being adjustable to vary the resilient bias of the disc against the bracket.

36. A device as called for in claim 33 wherein the other protuberance is disposed above the connection between the plate and the bracket so as to cause the lower portion of the plate to bear against said face portion of the bracket.

37. A device as called for in claim 36 wherein said one protuberance has a transverse dimension greater than the other protuberance so that the plate is inclined to said face portion of the bracket at a greater angle in a horizontal direction than in a vertical direction.

* * * * *